United States Patent
Lin et al.

(10) Patent No.: US 10,218,673 B2
(45) Date of Patent: Feb. 26, 2019

(54) WEB CONTENT DISPLAY SYSTEM AND METHOD

(71) Applicant: INSTITUTE FOR INFORMATION INDUSTRY, Taipei (TW)

(72) Inventors: Hsiang-Lun Lin, Taipei (TW); Hsiang-Lung Yang, Taipei (TW); Ping-Che Yang, Kaohsiung (TW); Tsun Ku, Taipei (TW)

(73) Assignee: Institute For Information Industry, Taipei (TW)

( * ) Notice: Subject to any disclaimer, the term of this patent is extended or adjusted under 35 U.S.C. 154(b) by 268 days.

(21) Appl. No.: 15/145,190

(22) Filed: May 3, 2016

(65) Prior Publication Data

US 2017/0142063 A1 May 18, 2017

(30) Foreign Application Priority Data

Nov. 18, 2015 (TW) .............................. 104138055 A

(51) Int. Cl.
 *G06F 17/30* (2006.01)
 *G06F 3/0481* (2013.01)
 (Continued)

(52) U.S. Cl.
 CPC ............ *H04L 61/35* (2013.01); *G06F 3/0481* (2013.01); *G06F 17/3089* (2013.01);
 (Continued)

(58) Field of Classification Search
 CPC ..................................................... G06Q 10/10
 (Continued)

(56) References Cited

U.S. PATENT DOCUMENTS 6,629,135 B1 * 9/2003 Ross, Jr. ................ G06Q 30/06
 709/218
7,818,399 B1 * 10/2010 Ross, Jr. ............ G06Q 30/0274
 709/215

(Continued)

FOREIGN PATENT DOCUMENTS

CN           102184351 B        7/2015

OTHER PUBLICATIONS

Taiwan Patent Office, Office action dated Oct. 3, 2016.

*Primary Examiner* — Cao H Nguyen
(74) *Attorney, Agent, or Firm* — Skaar Ulbrich Macari, P.A.

(57) ABSTRACT

A web content display system including a provided interface, a processor, a storage unit and an operation interface. The processor is coupled to the provided interface, the storage unit and the operation interface. The provided interface is for inputting a web address with an authorization data corresponding thereto. The processor acquires and analyzes at least one web content corresponding to the web address to obtain a title, an article content with a display format corresponding thereto and an original marketing content with a display format corresponding thereto. The storage unit stores analyzed information and a third party marketing content. The operation interface receives a request for the title from a user device. The processor generates an embedded code executed by a web browser to display a reorganized web content. The article contents of the reorganized web content and the web content have the same display format.

18 Claims, 6 Drawing Sheets

(51) Int. Cl.
*G06Q 30/02* (2012.01)
*H04L 29/12* (2006.01)
*H04L 29/08* (2006.01)

(52) U.S. Cl.
CPC ......... *G06Q 30/0277* (2013.01); *H04L 67/20* (2013.01); *H04L 67/22* (2013.01); *H04L 61/6004* (2013.01)

(58) Field of Classification Search
USPC .................................................. 715/719, 769
See application file for complete search history.

(56) References Cited

U.S. PATENT DOCUMENTS

| | | | |
|---|---|---|---|
| 7,958,103 B1 | 6/2011 | Tang et al. | |
| 2008/0071881 A1* | 3/2008 | Kronlund | G06Q 30/02 709/217 |
| 2011/0138429 A1* | 6/2011 | Schade | H04N 7/17318 725/98 |
| 2014/0304390 A1* | 10/2014 | Bates | H04L 12/6418 709/224 |

\* cited by examiner

WEB CONTENT DISPLAY SYSTEM AND METHOD

BACKGROUND

1. Technical Field

The present invention generally relates to a web page technology and, more particularly, to a web content display system and a method thereof.

2. Description of Related Art

Information on computer networks spreads quickly. The web content of a single web page can be reprinted fast. A web content provider produces the web content by creation and attaches advertisement to the web content such that the web content provider may be rewarded with adequate remuneration or reputation based on the number of times the web content has been reprinted or viewed. However, when the web content is reprinted by other person or website, the original content created by the author may be destructed. For example, the web content may be changed, composition of the web content may be changed, or watermark may be imposed on the web content. Additionally, when the author (i.e., the web content provider) updates the web content, the reprinted web content may not be updated simultaneously. Or, the reprinted web content may be attached with irrelevant advertisement by the person or website reprinting the web content, thus the reading experience can be defective. Furthermore, the author (web content provider) may not be rewarded even though the web content is reprinted, which is a loss to the author.

SUMMARY

One embodiment of the present invention provides a web content display system and a method thereof, using an embedded code to prevent a web content from being edited by a user.

One embodiment of the present invention provides a web content display system including a provided interface, a processor, a storage unit and an operation interface. The provided interface receives a web address with an authorization data corresponding thereto inputted by a web content provider. The processor is coupled to the provided interface and acquires and analyzes at least one web content corresponding to the web address according to the web address and the authorization data corresponding thereto to obtain a title corresponding to the web content, an article content with a display format corresponding thereto and an original marketing content with a display format corresponding thereto. The storage unit is coupled to the processor and stores, respectively, the title, the article content with the display format corresponding thereto, the original marketing content with the display format corresponding thereto and at least one third party marketing content. The operation interface is coupled to the processor and receives a request for the title from a user device. The processor generates an embedded code according to the request. The embedded code is executed by a web browser and is linked to the processor to display a reorganized web content on the web browser according to the article content with the display format corresponding thereto, the original marketing content with the display format corresponding thereto and the at least one third party marketing content. The article content of the reorganized web content and the article content of the web content have a same display format. A marketing content of the reorganized web content is the original marketing content of the web content or the at least one third party marketing content.

One embodiment of the present invention provides a web content display method including steps herein. A provided interface receives a web address with an authorization data corresponding thereto inputted by a web content provider. A processor acquires and analyzes at least one web content corresponding to the web address according to the web address and the authorization data corresponding thereto to obtain a title corresponding to the web content, an article content with a display format corresponding thereto and an original marketing content with a display format corresponding thereto. A storage unit stores the title, the article content with the display format corresponding thereto, the original marketing content with the display format corresponding thereto and at least one third party marketing content, respectively. An operation interface receives a request for the title from a user device. The processor generates an embedded code according to the request. The embedded code is executed by a web browser and is linked to the processor to display a reorganized web content on the web browser according to the article content with the display format corresponding thereto, the original marketing content with the display format corresponding thereto and the at least one third party marketing content. The article content of the reorganized web content and the article content of the web content have a same display format. A marketing content of the reorganized web content is the original marketing content of the web content or the at least one third party marketing content.

In summary, the present invention provides a web content display system and a method thereof to keep the completeness and composition of the web content by preventing the web content from being edited and keep the original marketing content or the third party marketing content of the web content. Accordingly, all rights of the web content provider can be reserved.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure.

[Embodiment of Web Content Display System]

Figure 1:
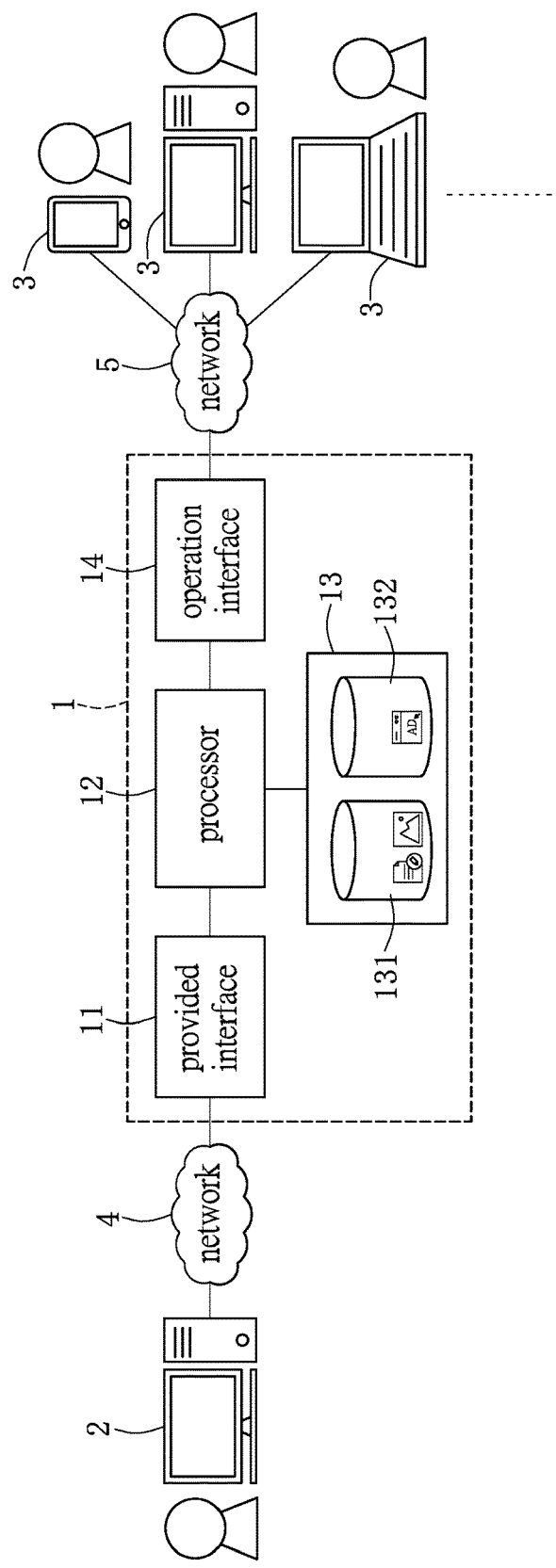
FIG. 1 is a block diagram of a web content display system according to one embodiment of the present invention.

Referring to FIG. 1, FIG. 1 is a block diagram of a web content display system according to one embodiment of the present invention. The web content display system 1 includes a provided interface 11, a processor 12, a storage unit 13 and an operation interface 14. The web content display system 1 is installed, for example, on a network server, to which the present invention is not limited.

The provided interface 11 is coupled to the processor 12. The storage unit 13 and the operation interface 14 are also coupled to the processor 12. In FIG. 1, the provided interface 11 is linked to one or more web content providers 2 through a network 4. The operation interface 14 is linked to multiple user devices 3 through a network 5. The present invention is not limited to the number of web content providers 2 and user devices 3, and is not limited to the types of networks 4 and 5.

The provided interface 11 receives a web address with an authorization data corresponding thereto inputted by the web content provider 2. The provided interface 11 may be a web browser or an operation interface for other applications. The input of the web address varies according to the type of the web page of the web content provider 2. The authorization data includes registration and license provided by the agents of the web content provider 2 and the web content display system 1. The input of the web address and the authorization data corresponding thereto can be exemplified herein, to which the present invention is not limited. In a first example, with the use of the web address of a service provider such as Google Blogger/Pixnet, the web content provider 2 can provide the web address on Google Blogger/Pixnet and authorize the web content display system 1 to access the web content thereon. The provided interface 11 accesses the web content through an application programming interface (API) of Google/Pixnet. For data authorization, Google Blogger, for example, uses Blogger API V3.0 to enable the user to view and update the content of blogs. Pixnet allows the user to execute an API on all public information without authentication but requires the user to be authenticated by Pixnet OAuth before accessing private information. In a second example, the user builds up a blog, i.e., a content management system (CMS), such as Wordpress, Joomla!, Drupal, etc. The web content provider 2 installs a plug-in developed by the web content display system 1 and provides a web address such that the plug-in automatically reprints the article into the web content display system 1. For data authorization, Wordpress, for example, uses APP ID to provide license. In a third example, for example other independent websites such as magazine websites, the service provider of the web content display system 1 can provide customized really simple syndication (RSS). The website of the web content provider 2 supports RSS 2.0 and determines the web address, and the web content display system 1 provides customized full-text RSS (since the general RSS only supports partial web feeds).

Figure 2:
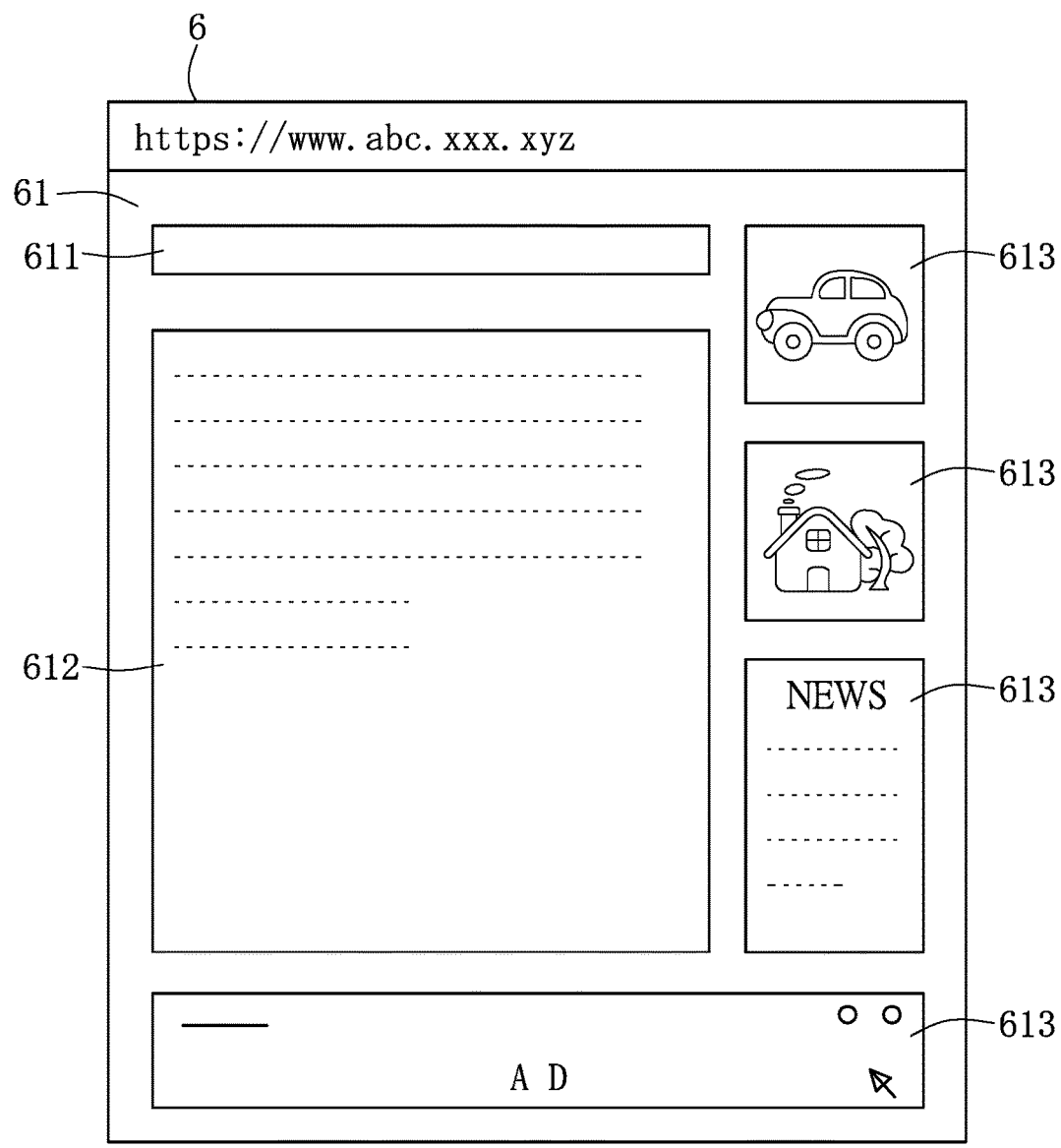
FIG. 2 is a schematic diagram of a web content according to one embodiment of the present invention.

The processor 12 acquires at least one web content corresponding to the web address according to the web address and the authorization data corresponding thereto to obtain a title corresponding to the web content, an article content with a display format corresponding thereto and an original marketing content with a display format corresponding thereto. Referring to the web address 6 in FIG. 2 as an example, the processor 12 analyzes the title 611, the article content 612 and the marketing content 613 of the web content 61. The display format of the article content 612 and the display format of the marketing content 613 can also be analyzed. The marketing content 613 is an advertisement on the web address 6 inputted by the web content provider 2. The marketing content 613 is a revenue source for the web content provider 2 with respect to the web address 6.

The storage unit 13 stores, respectively, the title 611, the article content 612 with the display format corresponding thereto, the original marketing content 613 with the display format corresponding thereto and at least one third party marketing content that are analyzed by the processor 12. The title 611 and the article content 612 with the display format corresponding thereto correspond to the content data 131 in the storage unit 13. In some specific embodiments, the storage unit 13 creates a corresponding coding ID when the storage unit 13 stores each title 611 and each article content 612 with the display format corresponding thereto. The storage unit 13 may also create a coding ID corresponding to each marketing data 13 when storing the marketing content 613 and the display format corresponding thereto and the third party marketing content according to the marketing data 132. The third party marketing content is an additional advertisement provided by the web content display system 1 to replace the marketing content 613. The use of the third party marketing content will be further described herein.

The operation interface 14 receives a request for the title from the user device 3. Each user device 3, for example, corresponds to a user. The user device 3 is, for example, a smart phone, a desktop computer, a tablet computer, a laptop computer, or any other electronic device for browsing web pages. Taking the structure in FIG. 1 for example, the operation interface 14 receives a request for the title from the user device 3 through the network 5. Accordingly, the web content display system 1 can store web contents on the web addresses inputted by multiple web content providers 2 and provide the user devices 3 with corresponding web contents according to the request of the title. In other words, the user device 3 can acquire the web content corresponding to the title according to the title. More particularly, if the user device 3 requests the title 611 in FIG. 2, the processor 12 generates an embedded code (for example, JavaScript) according to the request, the article content 612 with the display format corresponding thereto, the marketing content 613 with the display format corresponding thereto and the third party marketing content. A reorganized web content can be displayed through a web browser using the embedded code. The web browser is, for example, the operation interface 14 or any other web browser used by the user. The article content of the reorganized web content and the article content 612 of the web content have the same display format. The marketing content of the reorganized web content is the original marketing content 613 or the third party marketing content. Thereby, user device 3 can display the article content 612 with the original display format and display the original marketing content 613 or the third party marketing content determined by the web content display system 1 according to the title 611 requested by the user device 3.

Figure 3A:
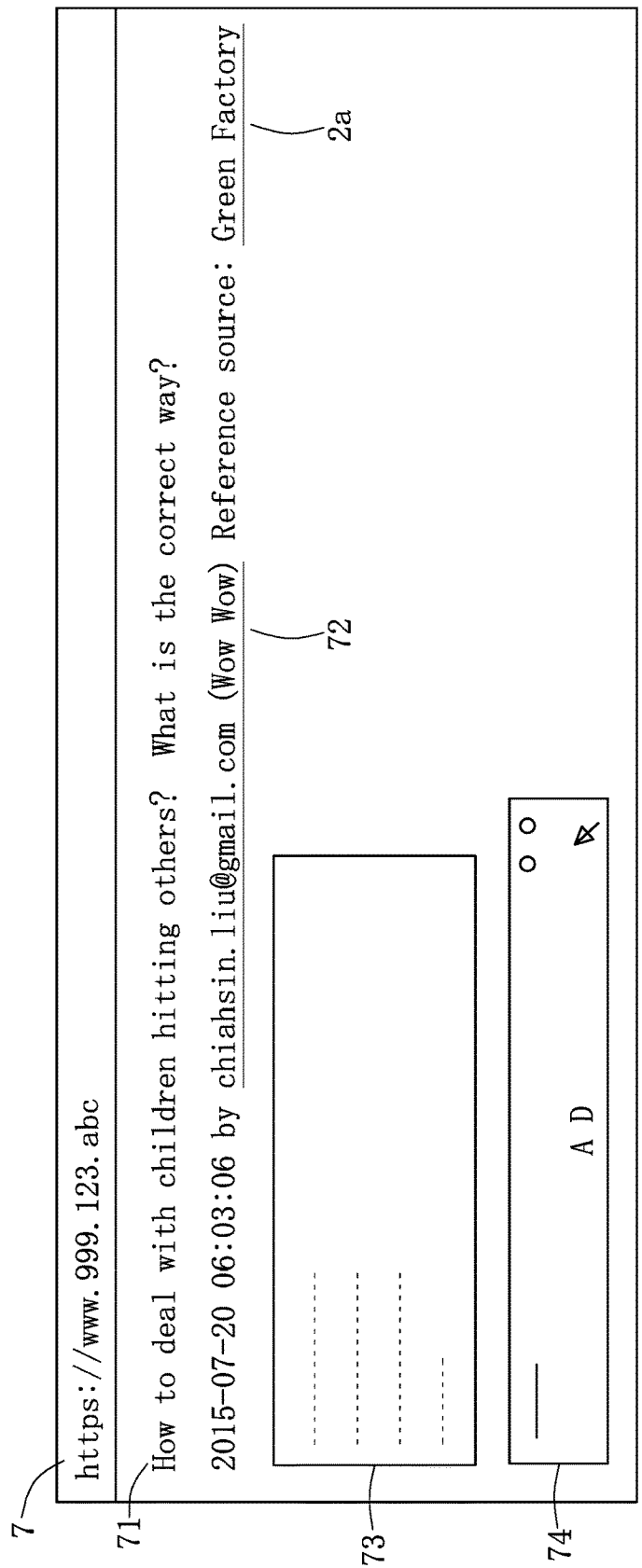
FIG. 3A is a schematic diagram of a web page of a reprinted web address according to one embodiment of the present invention.
Figure 3B:
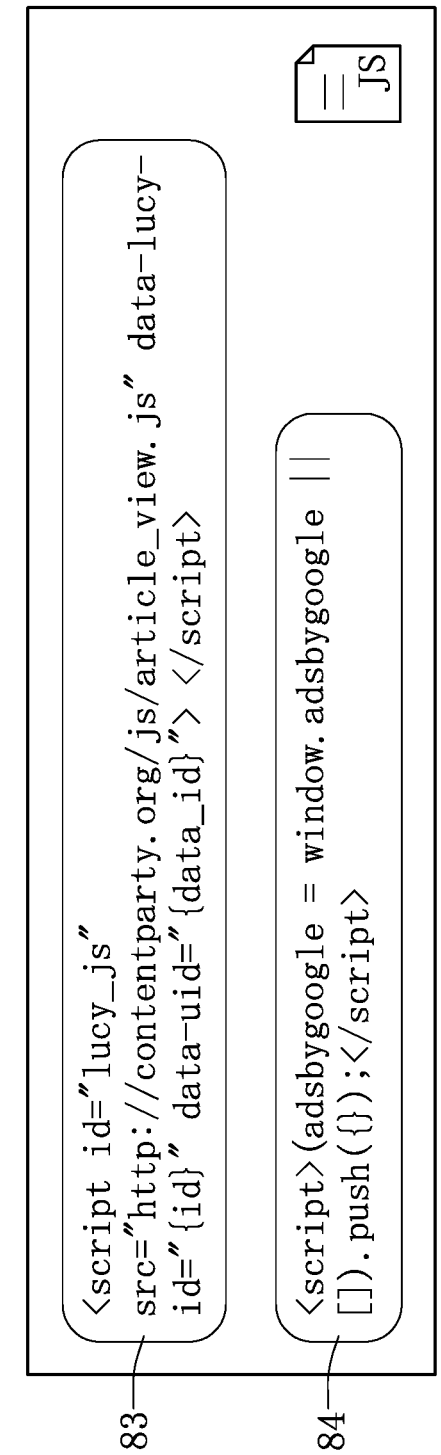
FIG. 3B is a schematic diagram of source codes of the web page in FIG. 3A.

The embodiment in FIG. 3A is taken as an example. When the user device 3 is to reprint the web content to other web address and website, the reprinted web content is displayed as shown in FIG. 3A. The reprinted web address 7 displays the reprinted title 71, the referrer 72, the original website 2a of the web content provider 2, the reprinted article content 73 and the marketing content 74. In the present embodiment, the web content display system 1 may provide the user device 3 with an embedded code corresponding to the reprinted web content so as to paste the web address of the embedded code on the web page and the website of the user. Therefore, the reprinted web address 7 is produced. When the other user clicks the reprinted web address 7, the web browser of the other user displays the reprinted article content 73 according to the embedded code. As shown in FIG. 3B, the reprinted web content 73 is displayed as the embedded code 83. The embedded code 83 includes a web address of a to-be-executed program and a specific coding ID corresponding to the requested article content 612. When the embedded code 83 is executed by the web browser, the web browser is linked to the web address of the to-be-executed program and accesses the specific coding ID corresponding to the article content 612. Then, the processor 12 executes the to-be-executed program according to the request of the web browser and acquires from the storage unit 13 the article content 612 with the display format corresponding thereto according to the specific coding ID. The processor 12 acquires the corresponding marketing content 74 and the reorganized web content to the web browser for display according to the marketing content code 84. More particularly, with the use of the embedded code 83, for example JavaScript, the user device 3 (i.e., the referrer 72 on the reprinted web page) cannot acquire the reprinted article content 73, but acquire the embedded code 83 and paste the embedded code 83 on the reprinted web page and website to generate a reprinted web address 7. When other user executes to display the reprinted web address 7 using a web browser or an APP displaying the web address, the embedded code 83 is executed and is linked to the processor 12 to acquire the reorganized web content. Therefore, the user device 3 cannot obtain or change any information of the web content 73. When the web browser or the APP displaying the web address executes the embedded code 83, the information of the web content 73 will be accessed from the storage unit 13 of the web content display system 1 and displayed on the web browser.

In one specific embodiment, the processor 12 generates an embedded code (JavaScript) through a content streaming module according to the specific coding ID of the article content 612. The processor 12 matches and combines the article content 612 and the marketing data (includes the marketing content 613 and the third party marketing content) through a content mixing module to provide the reorganized web content which is more valuable.

Figure 4:
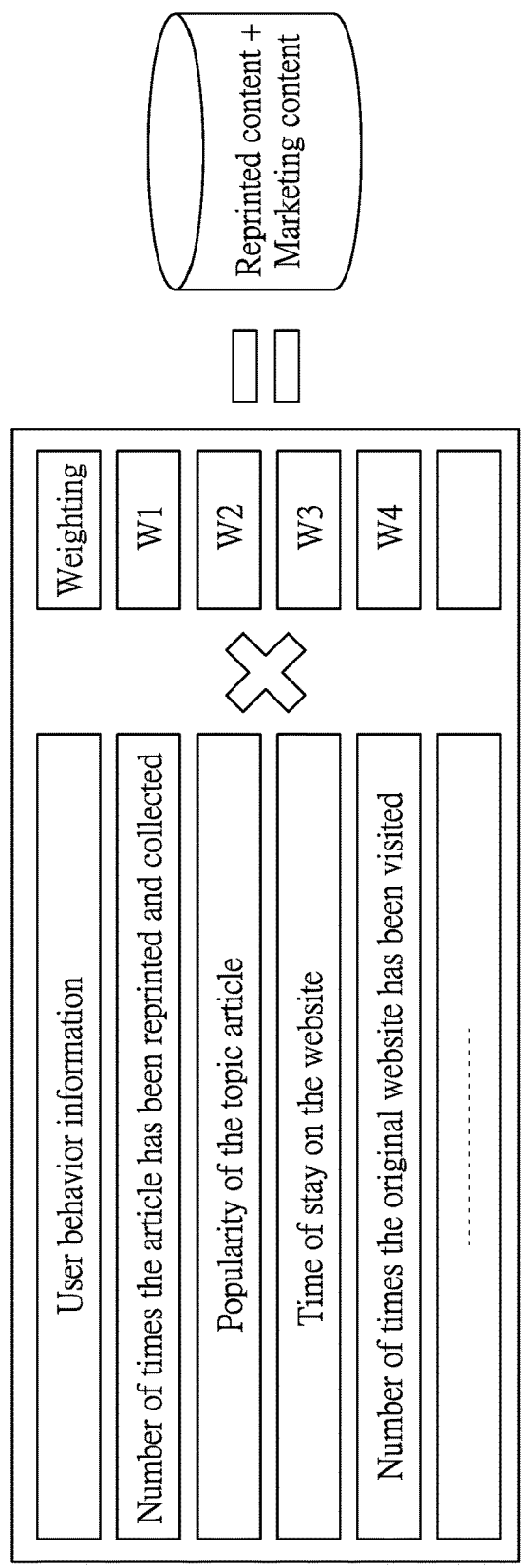
FIG. 4 is a schematic diagram showing the decision of a marketing content based on the activity information on the web browser and the weighting according to one embodiment of the present invention.

Furthermore, in one embodiment, the processor 12 collects and analyzes the activity information of the web browser when the web browser executes the embedded code and selects a marketing content from the third party marketing content according to the activity information of the web browser to replace the original marketing content 613. The activity information includes the information collected by the web content display system 1 such as text analysis of the article content 612, popularity of the articles, etc. The activity information may include the operation of the web browser being linked to the processor 12 such as the number of times the web browser reprints and collects the authorization data, the time of stay on the web browser and the number of times of reverse linking of the web browser (i.e., linkage to the original website 2a of the web content provider 2 when the web browser is as shown in FIG. 3A), to which the present invention is not limited. One embodiment is provided to exemplify how to generate a marketing content being more valuable to replace the original marketing content, to which the present invention is not limited. Referring to FIG. 4, FIG. 4 is a schematic diagram showing the decision of a marketing content based on the activity information on the web browser and the weighting according to one embodiment of the present invention. According to the number of times the web page article has been reprinted and collected, the popularity of the topic articles, the time of stay on the web browser, and the number of times the original website has been visited weighted, respectively, by the weightings W1, W2, W3 and W4, a marketing content being more valuable can be determined. The activity information and weightings are only exemplary, to which the present invention is not limited.

Moreover, the time of stay on the web browser can be calculated by the processor 12 providing a JavaScrip to automatically record the accessing and the logout of the user. The number of times of reverse linking is calculated by the web content display system 1 when the user clicks to link back to the original website (2a) of the web content provider. The processor 12 may keep the number of times of reverse linking of the web browser so that the content provider 2 can track the guests of the website.

Furthermore, in one embodiment, since different users may use different electronic devices and different web browsers to display the reorganized web page, the processor 12 further uses responsive web design to adjust the display format of the article content 612 or the display format of the marketing content 613 such that the web content 612 automatically adapts the display interfaces on the different electronic device. Accordingly, the web content can be displayed on different media players (such as an App or a bulletin board system).

[Embodiment of Web Content Display Method]

Figure 5:
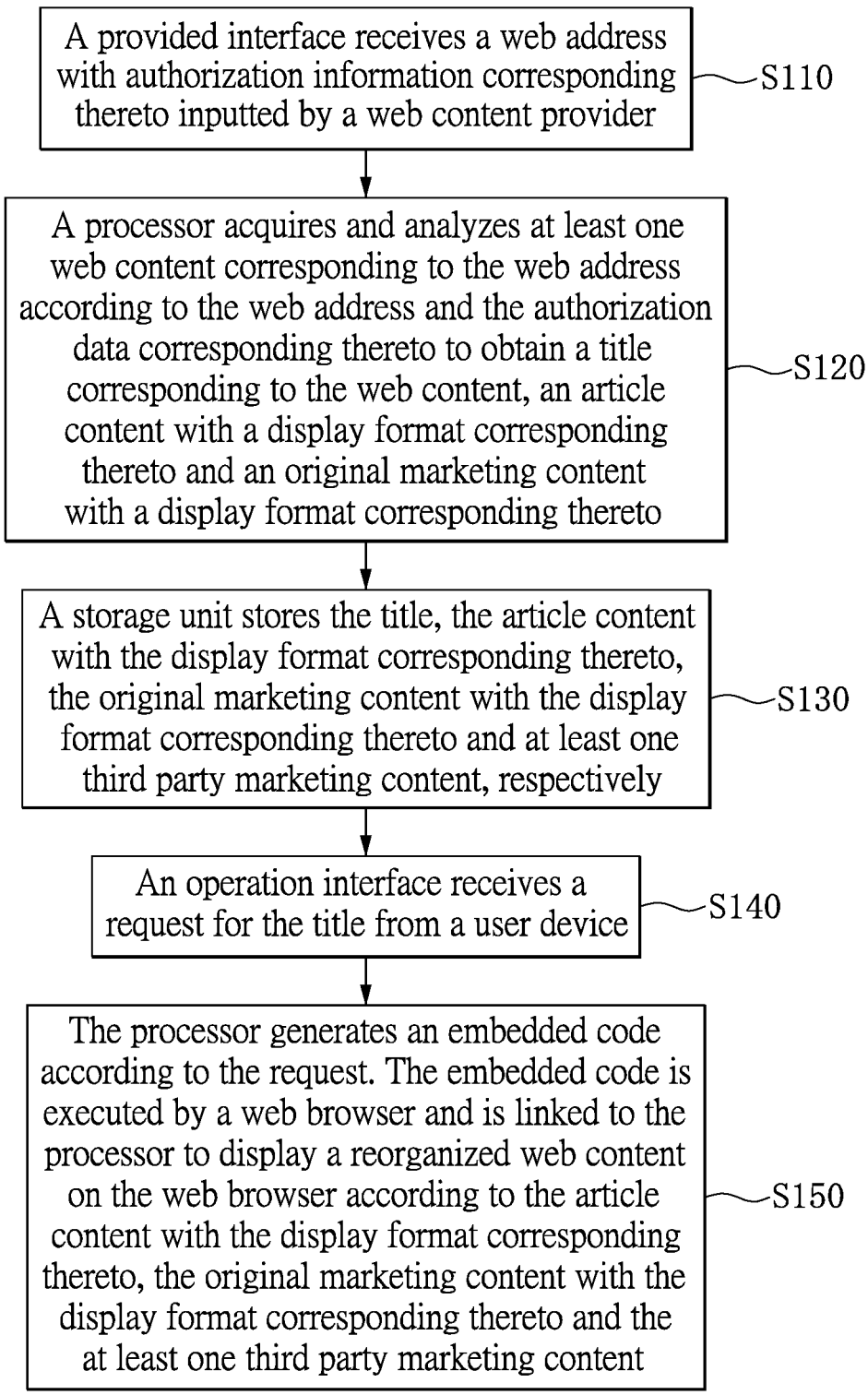
FIG. 5 is a flowchart of a web content display method according to one embodiment of the present invention.

Referring to FIG. 5, FIG. 5 is a flowchart of a web content display method according to one embodiment of the present invention. The web content display method uses the web content display system 1 in FIG. 1. The web content display method includes the steps herein. First, in Step S110, a provided interface 11 receives a web address with an authorization data corresponding thereto inputted by a web content provider 2. Then, in Step S120, a processor 12 acquires and analyzes at least one web content corresponding to the web address according to the web address and the authorization data corresponding thereto to obtain a title corresponding to the web content, an article content with a display format corresponding thereto and an original marketing content with a display format corresponding thereto. Then, in Step S130, a storage unit 13 stores the title, the article content with the display format corresponding thereto, the original marketing content with the display format corresponding thereto and at least one third party marketing content, respectively. In Step S140, an operation interface 14 receives a request for the title from a user device 3. As shown in FIG. 1, the operation interface 14 receives a request for a title from the user device 3.

Then, in Step S150, the processor 120 generates an embedded code according to the request. The embedded code is executed by a web browser and is linked to the processor to display a reorganized web content on the web browser according to the article content with the display format corresponding thereto, the original marketing content with the display format corresponding thereto and the at least one third party marketing content. The article content of the reorganized web content and the article content of the web content have a same display format. A marketing content of the reorganized web content is the original marketing content of the web content or the at least one third party marketing content.

In one embodiment, in Step S150, the processor 12 collects and analyzes the activity information of the web browser when the web browser executes the embedded code. The processor 12 selects a corresponding marketing content from the at least one third party marketing content according to the activity information of the web browser to replace the original marketing content. The activity information of the web browser includes the number of times the authorization data has been reprinted and collected by the web, the time of stay on the web browser and the number of times of reverse linking of the web browser, to which the present invention is not limited. In one embodiment, the processor 12 may record the number of times of reverse linking of the web browser. In one embodiment, in Step S150, the processor 12 uses responsive web design to adjust the display format of the article content or the display format of the marketing content such that the web content automatically adapts the display interface of the user device 3. The details of the foregoing steps can be understood with reference to the foregoing embodiment and will not be repeated herein.

[Effects of the Embodiments]

As previously stated, the present invention provides a web content display system and a method thereof, using an embedded code to keep the completeness and composition of the web content by preventing the web content from being edited and keep the original marketing content or the third party marketing content of the web content. Accordingly, all rights of the web content provider can be reserved. Furthermore, the web content automatically adapts the composition of the website. The web content may be displayed on different media (such as an APP or a bulletin board system). Cross-media contents and cross-author contents may also be displayed integratedly using an API. In the present invention, the web content display system and the method thereof enable the web content to be displayed unlimited to the insufficient traffic of the network. Moreover, the web content display system and the method thereof collect the user's behavior information such as the number of times of reverse linking. When the user clicks to link back to the original website, the platform of the system records the user's behavior information such that the content provider track the guests of the website (if the user does click). Accordingly, the original marketing content can be replaced by an advertisement being more valuable.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A web content display system, comprising:
   a provided interface, for receiving a web address with an authorization data corresponding thereto inputted by a web content provider;
   a processor, coupled to said provided interface and acquiring and analyzing at least one web content corresponding to said web address according to said web address and said authorization data corresponding thereto to obtain a title corresponding to said web content, an article content with a display format corresponding thereto and an original marketing content with a display format corresponding thereto;
   a storage unit, coupled to the said processor and storing respectively, said title, said article content with said display format corresponding thereto, said original marketing content with said display format corresponding thereto and at least one third party marketing content; and
   an operation interface, coupled to the said processor and receiving a request for said title from a user device;
   wherein said processor generates an embedded code and a reprinted web address corresponding to the embedded code according to said request, wherein when executing to display the reprinted address, said embedded code is executed by a web browser and is linked to said processor to display a reorganized web content on said web browser according to said article content with said display format corresponding thereto, said original marketing content with said display format corresponding thereto and said at least one third party marketing content, wherein said article content of said reorganized web content and said article content of said web content have a same display format, wherein a marketing content of said reorganized web content is said original marketing content of said web content or said at least one third party marketing content.

2. The web content display system according to claim 1, wherein said original marketing content or said at least one third party marketing content comprises at least one advertisement.

3. The web content display system according to claim 1, wherein said operation interface receives said request from said user device through a network.

4. The web content display system according to claim 1, wherein said processor collects and analyzes activity information of said web browser when said web browser executes said embedded code, and selects one from said at least one third party marketing content according to said activity information of said web browser to replace said original marketing content.

5. The web content display system according to claim 1, wherein said processor uses responsive web design to adjust said display format of said article content or said display format of said marketing content such that said web content automatically adapts a display interface of said user device.

6. The web content display system according to claim 4, wherein said activity information of said web browser comprises number of times said authorization data have been reprinted and collected, time of stay on a web page corresponding to said reorganized web content and number of times of reverse linking of said web browser.

7. The web content display system according to claim 1, wherein said embedded code is JavaScript.

8. The web content display system according to claim 6, wherein said processor further records said number of times of reverse linking of said web browser.

9. The web content display system according to claim 1, wherein said web content display system is installed in a network server.

10. A web content display method, comprising:
receiving, by a provided interface, a web address with an authorization data corresponding thereto inputted by a web content provider;
acquiring and analyzing, by a processor, at least one web content corresponding to said web address according to said web address and said authorization data corresponding thereto to obtain a title corresponding to said web content, an article content with a display format corresponding thereto and an original marketing content with a display format corresponding thereto;
storing, by a storage unit, said title, said article content with said display format corresponding thereto, said original marketing content with said display format corresponding thereto and at least one third party marketing content, respectively;
receiving, by an operation interface, a request for said title from a user device; and
generating, by said processor, an embedded code and a reprinted web address corresponding to the embedded code according to said request, wherein when executing to display the reprinted address, said embedded code is executed by a web browser and is linked to said processor to display a reorganized web content on said web browser according to said article content with said display format corresponding thereto, said original marketing content with said display format corresponding thereto and said at least one third party marketing content, wherein said article content of said reorganized web content and said article content of said web content have a same display format, wherein a marketing content of said reorganized web content is said original marketing content of said web content or said at least one third party marketing content.

11. The web content display method according to claim 10, wherein said original marketing content or said at least one third party marketing content comprises at least one advertisement.

12. The web content display method according to claim 10, wherein said operation interface receives said request from said user device through a network.

13. The web content display method according to claim 10, wherein, in the step of displaying said reorganized web content, said processor collects and analyzes activity information of said web browser when said web browser executes said embedded code, and selects one from said at least one third party marketing content according to said activity information of said web browser to replace said original marketing content.

14. The web content display method according to claim 10, wherein, in the step of displaying said reorganized web content, said processor uses responsive web design to adjust said display format of said article content or said display format of said marketing content such that said web content automatically adapts a display interface of said user device.

15. The web content display method according to claim 13, wherein said activity information of said web browser comprises number of times said authorization data have been reprinted and collected, time of stay on a web page corresponding to said reorganized web content and number of times of reverse linking of said web browser.

16. The web content display method according to claim 10, wherein said embedded code is JavaScript.

17. The web content display method according to claim 15, further comprising: recording, by said processor, said number of times of reverse linking of said web browser.

18. The web content display method according to claim 10, wherein said web content display system is installed in a network server.

* * * * *